United States Patent
R et al.

(10) Patent No.: US 9,740,726 B2
(45) Date of Patent: Aug. 22, 2017

(54) METHODS FOR DYNAMIC DESTRUCTION OF DATA IN A REMOTE DATA STORAGE PLATFORM AND DEVICES THEREOF

(71) Applicant: Infosys Limited, Bangalore (IN)

(72) Inventors: Sravan R, Hyderabad (IN); Mithun Paul, Kerala (IN); Ashutosh Saxena, Hyderabad (IN)

(73) Assignee: Infosys Limited, Bangalore (IN)

( * ) Notice: Subject to any disclaimer, the term of this patent is extended or adjusted under 35 U.S.C. 154(b) by 14 days.

(21) Appl. No.: 14/635,867

(22) Filed: Mar. 2, 2015

(65) Prior Publication Data

US 2015/0261964 A1  Sep. 17, 2015

(30) Foreign Application Priority Data

Mar. 13, 2014 (IN) .......................... 1331/CHE/2014

(51) Int. Cl.
| | |
|---|---|
| *G06F 21/00* | (2013.01) |
| *H04L 29/06* | (2006.01) |
| *G06F 17/30* | (2006.01) |
| *G06F 21/62* | (2013.01) |
| *G06F 21/34* | (2013.01) |

(52) U.S. Cl.
CPC .... *G06F 17/30345* (2013.01); *G06F 21/6272* (2013.01); *G06F 2221/2123* (2013.01); *G06F 2221/2143* (2013.01)

(58) Field of Classification Search
CPC ........... G06F 17/30345; G06F 21/6272; G06F 2221/2123; G06F 2221/2143; G06F 31/0623
See application file for complete search history.

(56) References Cited

U.S. PATENT DOCUMENTS

| | | |
|---|---|---|
| 7,308,543 B2 | 12/2007 | Kishi |
| 8,090,923 B2 | 1/2012 | Kawamura |

(Continued)

FOREIGN PATENT DOCUMENTS

IN   WO 2007045968 A2 *  4/2007  ....... G06F 17/30067

OTHER PUBLICATIONS

Hui Zhang, Frank Wm. Tompa; "Querying XML documents by dynamic shredding"; Oct. 2004; DocEng '04: Proceedings of the 2004 ACM symposium on Document engineering; Publisher: ACM; pp. 21-30.*

(Continued)

*Primary Examiner* — Mohammad W Reza
*Assistant Examiner* — Courtney Fields
(74) *Attorney, Agent, or Firm* — Klarquist Sparkman, LLP

(57) ABSTRACT

The technique relates to a method and apparatus for dynamic destruction of data in a remote data storage platform. This involves receiving a first set of data records with random values and then updating the random values associated with the subsets of the first set of data records into actual values through one or more update operations. After sequential steps of updates, a second set of data records with actual values are obtained. After working of this data for a period of time the owner of the data again begins updating the actual values associated with the subset of the second set of data records into random values. When all the data records are updated to random values the owner of the data successfully ends the Service Level Agreement period.

13 Claims, 3 Drawing Sheets

(56) References Cited

U.S. PATENT DOCUMENTS

2007/0300031 A1* 12/2007 Jevans ................... G06F 21/60
                                                    711/166
2008/0177811 A1*  7/2008 Cannon ................. G06F 3/0623
2012/0079189 A1*  3/2012 Colgrove ............. G06F 3/0605
                                                    711/114

OTHER PUBLICATIONS

Paul et al., "Proof of Erasability for Ensuring Comprehensive Data Deletion in Cloud Computing, CNSA," '10 Proceedings of the Third International Conference, Communications in Computer and Information Science, vol. 89, 2010, pp. 340-348, 9 pages.

Paul et al., "Zero Data Remnance Proof in Cloud Storage," International Journal of Network Security & Its Applications (IJNSA), vol. 2, No. 4, Oct. 2010, 10 pages.

Paul et al., "Datashredding Service for Cloud," Proceedings of the $2^{nd}$ International Conference on Services in Emerging Markets, Mumbai, Sep. 2011, 5 pages.

Kamara et al., "Cryptographic Cloud Storage," in Proceedings of the $14^{th}$ International Conference on Financial Cryptography and Data Security (FC'10), Springer Berlin Heidelberg, 2010, 14 pages.

* cited by examiner

METHODS FOR DYNAMIC DESTRUCTION OF DATA IN A REMOTE DATA STORAGE PLATFORM AND DEVICES THEREOF

RELATED APPLICATION DATA

This application claims priority to India Patent Application No. 1331/CHE/2014, filed Mar. 13, 2014, the disclosure of which is hereby incorporated by reference in its entirety.

FIELD OF THE INVENTION

This invention relates generally to data destruction technology, and in particular, to a method and apparatus for dynamic destruction of data in a remote data storage platform.

BACKGROUND

Remote Data Storage Platforms (RDSP) are a large pool of easily usable and accessible virtualized resources. The core idea in a RDSP environment is that a user stores his personal files in a RDSP, and can retrieve them irrespective of time and geographical barriers. The storage provider in RDSP thus provides its Clients (which typically include corporates and conglomerates) to store their business or any other data with a third party possibly in an unknown location. However, after the usage of the storage provided by the RDSP the owner of the data "vacates" his provided space in the RDSP. This space may be further allocated to some other user. For security and privacy concerns the owner of the data may wish to completely destroy his data stored in the RDSP before vacating the space. Post the storage period the client will have concerns about the state of the data he leaves with the storage provider—if the data is not shredded there is a possibility of it being used for malicious purposes. Though there are many data shredding methods that are developed for destruction of data at local storages there is still a necessity to develop a secure and robust data destruction algorithms in RDSPs. Such platforms are different from local data storages in the sense that the owner of the data does not possess any physical access to the data at the RDSP.

The few methods that are developed for data destruction at RDSPs suffer from many drawbacks. An RDSP being in physical access to the data can easily backtrack any of the update operations and build a good copy of the owner's data even after data destruction by these methods. Also these data destruction methods do not take into consideration the possibility of the RDSP taking an initial copy or making mirror images of the data and thereby using the data for malicious purposes. Hence there is a necessity for secure data destruction methods in RDSPs.

SUMMARY

The present disclosure overcomes all the above mentioned drawbacks by continuously updating the data from the beginning to the end of the SLA (Service level agreement) period. Across this period there will be a time window, known only to the client, during which the data becomes actually useful and thus sensitive. Moreover every data instance will be shredded in a variable manner different from each other so that at no point of time a systematic back tracking will lead to a continuous set of sensitive data. Also the initial data used for storage will be filled with useless data so that a secret archival by the RDSP at any point of time won't reveal any sensitive data According to the present embodiment, a method for dynamic destruction of data in a remote data storage platform is disclosed. The method includes creating a first set of data records with random values in a space provided by the remote data storage platform. The random values associated with one or more subsets of the first set of data records are updated into actual values through one or more update operations. After sequential update of the one or more subsets of the first set of data records, a second set of data records with the actual values are obtained. Then, at the time of data destruction, the actual values associated with one or more subsets of the second set of data records are converted to the random values through a plurality of update operations.

In an additional embodiment, an apparatus for dynamic destruction of data in a remote data storage platform is disclosed. The apparatus includes a memory coupled to one or more processors which are configured to execute programmed instructions stored in the memory including creating a first set of data records with random values in a space provided by the remote data storage platform, updating the random values associated with one or more subsets of the first set of data records into actual values through one or more update operations, obtaining a second set of data records with the actual values by updating all of the one or more subsets of the first set of data records sequentially and converting the actual values associated with one or more subsets of the second set of data records to the random values through a plurality of update operations at the time of data destruction.

In another embodiment, a computer readable storage medium for dynamic destruction of data in a remote data storage platform is disclosed. The computer readable storage medium which is not a signal stores computer executable instructions for creating a first set of data records with random values in a space provided by the remote data storage platform, updating the random values associated with one or more subsets of the first set of data records into actual values through one or more update operations, obtaining a second set of data records with the actual values by updating all of the one or more subsets of the first set of data records sequentially and converting the actual values associated with one or more subsets of the second set of data records to the random values through a plurality of update operations at the time of data destruction.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. These simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a method and apparatus for dynamic destruction of data in a remote data storage platform. This involves receiving a first set of data records with random values and then updating the random values associated with the subsets of the first set of data records into actual values through one or more update operations. After sequential steps of updating, a second set of data records with actual values are obtained. After working of this data for a period of time the owner of the data again begins updating the actual values associated with the subset of the second set of data records into random values. When all the data records are updated to random values the owner of the data successfully ends the Service Level Agreement period.

Figure 1:
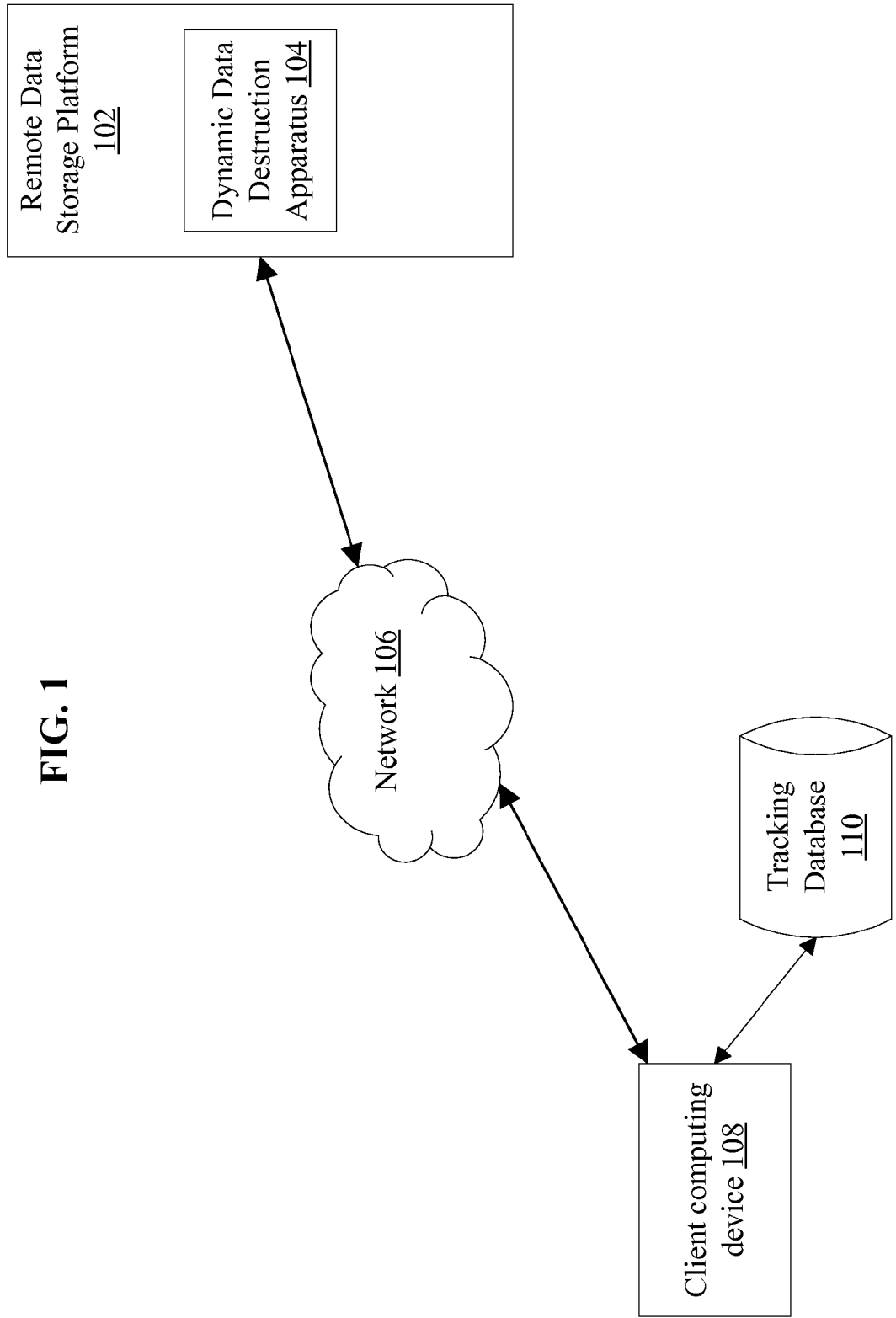
FIG. 1 is a computing environment capable of implementing the embodiments presented herein.

FIG. 1 is a computing environment capable of implementing the embodiments presented herein. The computing environment includes remote data storage platform 102 which contains dynamic data destruction apparatus 104. The computing environment further includes network 106 and client computing device 108. Client computing device 108 is further connected to a tracking database 110. This environment can include other types and numbers of systems, devices, components, and elements in other configurations, such as multiple numbers of each of these apparatuses and devices. With the help of client computing device 108, clients communicate with the remote data storage platform 102 trough communication network 106. By way of example, the communications network 106 could use TCP/IP over Ethernet and industry-standard protocols, including NFS, CIFS, SOAP, XML, LDAP, and SNMP, although other types and numbers of communication networks, such as a direct connection, a local area network, a wide area network, a personal area network, such as Bluetooth, modems and phone lines, e-mail, and wireless communication technology, each having their own communications protocols, can be used. In an alternate embodiment, the dynamic data destruction apparatus 104 can be implemented with a trusted third party destructor.

Figure 2:
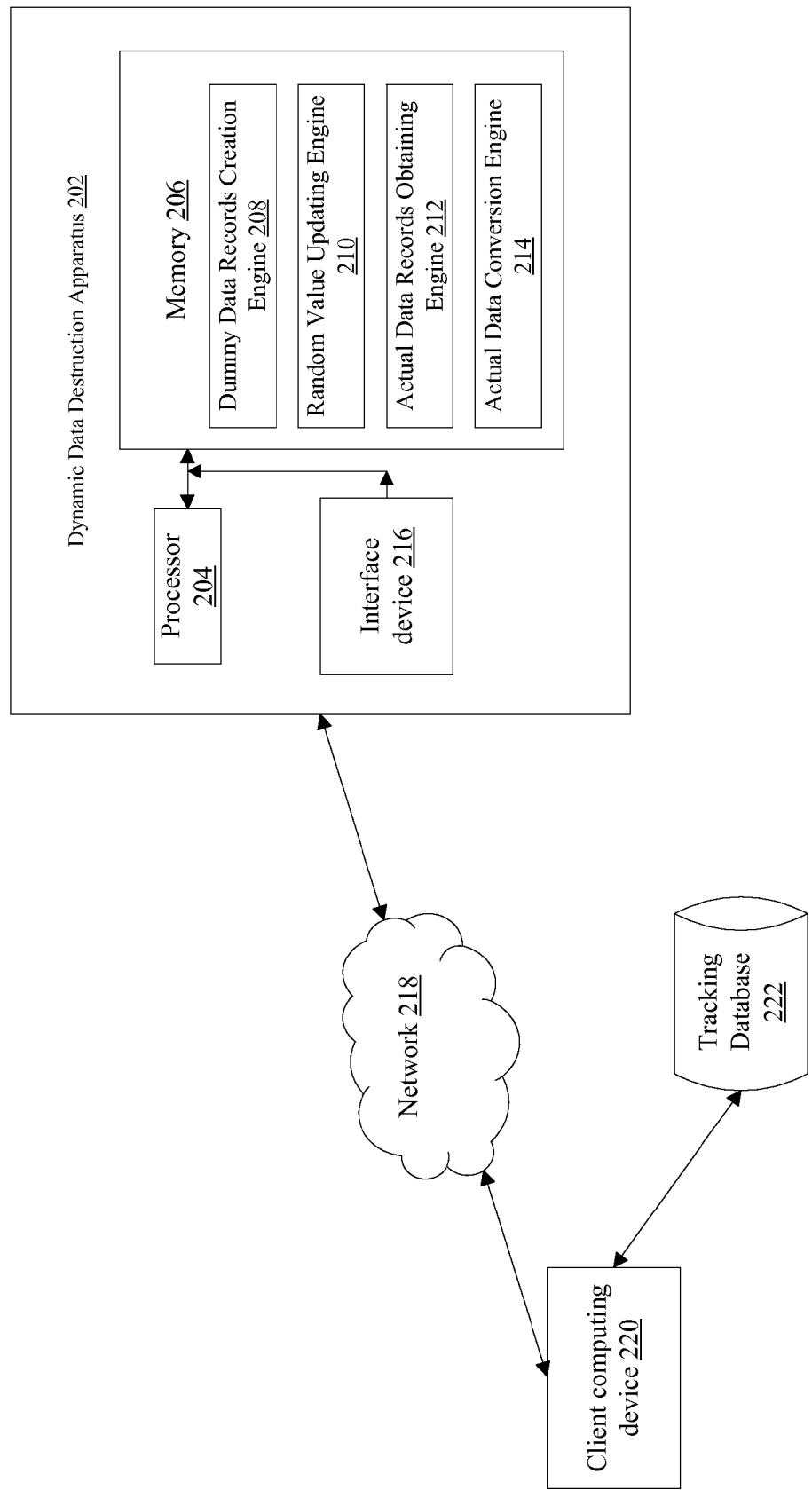
FIG. 2 illustrates the exemplary dynamic data destruction apparatus, in accordance with an embodiment of the present invention.

FIG. 2 illustrates the exemplary dynamic data destruction apparatus, in accordance with an embodiment of the present invention. The dynamic data destruction apparatus 202 includes a central processing unit (CPU) or processor 204, a memory 206, and an interface device 216 which are coupled together by a bus or other link, although other numbers and types of systems, devices, components, and elements in other configurations and locations can be used. The processor 204 executes a program of stored instructions for one or more aspects of the present technology as described and illustrated by way of the examples herein, although other types and numbers of processing devices and logic could be used and the processor could execute other numbers and types of programmed instructions.

The memory 206 stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 204, can be used for the memory 206. The memory 206 also includes dummy data records creation engine 208, random value updating engine 210, actual data records obtaining engine 212, actual data conversion engine 214. The dummy data records creation engine 208 is configured to create a first set of data records with random values in a space provided by the remote data storage platform 102. The random value updating engine 210 is configured to update the random values associated with one or more subsets of the first set of data records into actual values through one or more update operations. The actual data records obtaining engine 212 is configured to obtain a second set of data records with the actual values by updating all of the one or more subsets of the first set of data records sequentially. The actual data conversion engine 214 is configured to convert the actual values associated with one or more subsets of the second set of data records to the random values through a plurality of update operations at the time of data destruction.

The interface device 216 in the dynamic data destruction apparatus 202 is used to operatively couple and communicate between the dynamic data destruction apparatus 202 and the client computing device 220 via communication network 218.

Figure 3:
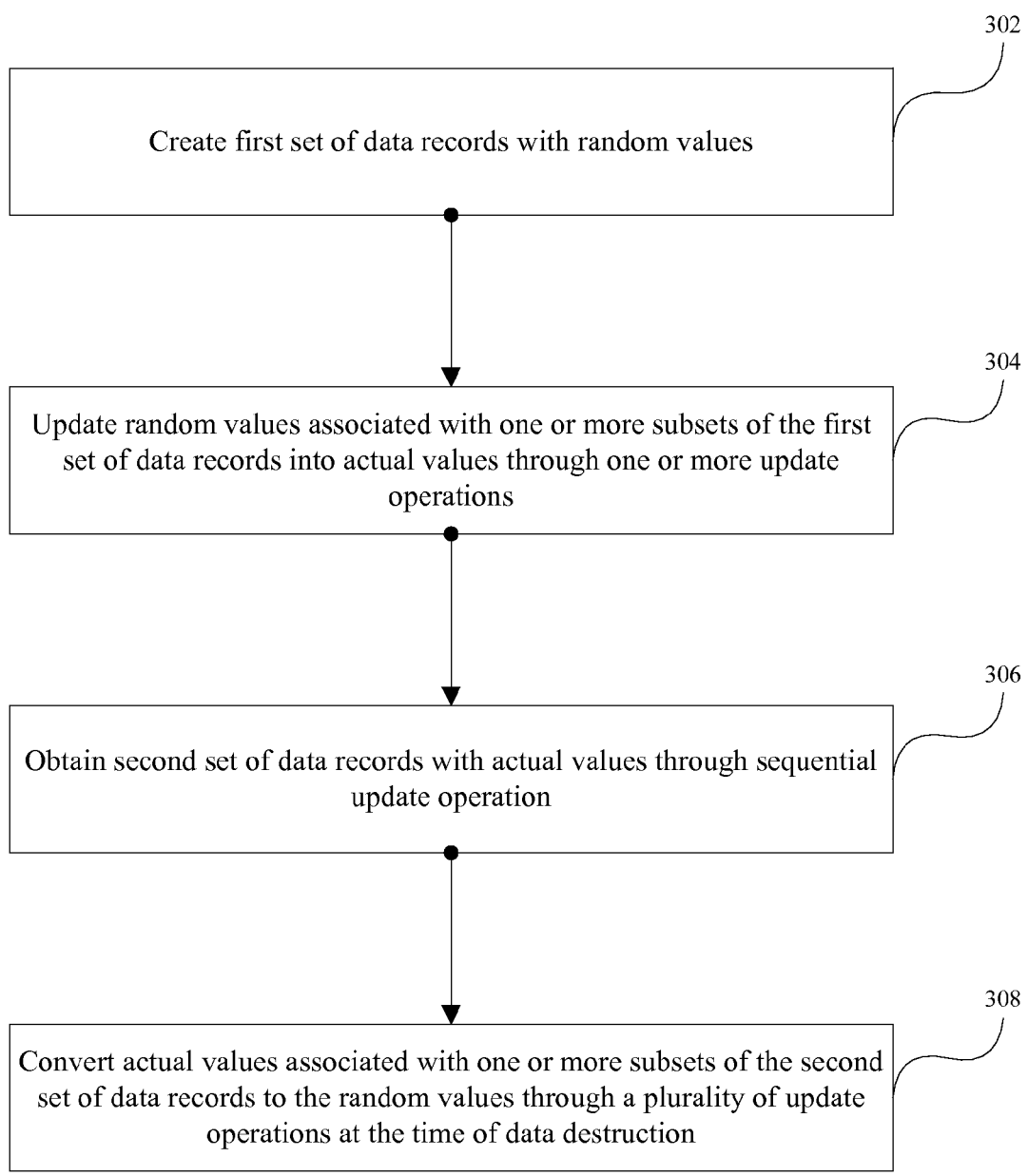
FIG. 3 is a flowchart, illustrating a method for dynamic destruction of data in a remote data storage platform, in accordance with an embodiment of the present invention.

FIG. 3 is a flowchart, illustrating a method for dynamic destruction of data in a remote data storage platform, in accordance with an embodiment of the present invention. A first set of data records with random/dummy values are created in the remote data storage platform (102) at step 302. By doing this the initial data is made non-usable by the remote data storage service provider even in case the server takes a secret copy at initial stage. The random values associated with one or more subsets of the first set of data records are updated into actual values through one or more update operations at 304. The number of update operations on particular data records of the first set of data records may vary from the other data records of that set. A subset of first set of data records can be updated during the same period of time during which another subset of the first set of data records are being updated. A track of data records with actual values and random/dummy values is kept by the client during the updating of the complete set of data records. This track may be maintained in a personalized device which is not connected to the remote data storing platform to maintain security or privacy against any kind of attacks arising from that network. By sequential update operation on the first set of data records, a second set of data records with the actual values are obtained at step 306. The time of obtaining second set of data records with actual values may vary for each data record of the first set of data records. For example, data record A of the first set of data records may be updated to actual values after three update operations and data record B of the first set of data records may be updated after five update operations. But the time at which all the data entries will be with actual values will be known only to the client even though the remote data storage provider is aware of all the updates from the beginning of the SLA period. After working of this data for a period of time the owner of the data begins converting the actual values associated with one or more subsets of the second set of data records to the random values through a plurality of update operations at step 308. When all the second set of data records are updated to random/dummy values the client successfully ends the SLA period.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer-implemented method executed by one or more computing devices for dynamic destruction of data in a remote data storage platform, comprising:
    creating, by at least one of the one or more computing devices, a first set of data records with random values in a space provided by the remote data storage platform;
    updating, by at least one of the one or more computing devices, the random values associated with one or more subsets of the first set of data records into actual values through one or more update operations, wherein the one or more update operations on one of the one or more subsets of the first set of data records are interlaced with other subsets of the one or more subsets of the first set of data records;
    during a time window, after the one or more update operations have updated the random values associated with the one or more subsets of the first set of data records into actual values, obtaining, by at least one of the one or more computing devices, a second set of data records with the actual values; and
    after a client of the remote data storage platform works on the second set of data records with the actual values, converting, by at least one of the one or more computing devices, the actual values associated with one or more subsets of the second set of data records to the random values through a plurality of update operations at a time of data destruction.

2. The method of claim 1, further comprising keeping track of data records with the random values and data records with the actual values during the updating.

3. The method of claim 1, wherein the plurality of update operations on one of the one or more subsets of the second set of data records are interlaced with other subsets of the one or more subsets of the second set of data records.

4. The method of claim 1, wherein the remote data storage platform is a cloud data storage provider.

5. An apparatus for dynamic destruction of data in a remote data storage platform, the apparatus comprising:
    one or more processors; and
    one or more memories operatively coupled to at least one of the one or more processors and having instructions stored thereon that, when executed by at least one of the one or more processors, cause at least one of the one or more processors to:
    create a first set of data records with random values in a space provided by the remote data storage platform;
    update the random values associated with one or more subsets of the first set of data records into actual values through one or more update operations, wherein the one or more update operations on one of the one or more subsets of the first set of data records are interlaced with other subsets of the one or more subsets of the first set of data records;
    during a time window, after the one or more update operations have updated the random values associated with the one or more subsets of the first set of data records into actual values, obtain a second set of data records with the actual values; and
    after a client of the remote data storage platform works on the second set of data records with the actual values, convert the actual values associated with one or more subsets of the second set of data records to the random values through a plurality of update operations at a time of data destruction.

6. The apparatus of claim 5, wherein the plurality of update operations on one of the one or more subsets of the second set of data records are interlaced with other subsets of the one or more subsets of the second set of data records.

7. The apparatus of claim 5, wherein the remote data storage platform is a cloud data storage provider.

8. At least one non-transitory computer-readable medium storing computer-readable instructions that, when executed by one or more computing devices, cause at least one of the one or more computing devices to:
    create a first set of data records with random values in a space provided by a remote data storage platform;
    update the random values associated with one or more subsets of the first set of data records into actual values through one or more update operations;
    during a time window, after the one or more update operations have updated the random values associated with the one or more subsets of the first set of data records into actual values, obtain a second set of data records with the actual values, wherein the time window is known only to a client of the remote data storage platform; and
    after the client of the remote data storage platform works on the second set of data records with the actual values, convert the actual values associated with one or more subsets of the second set of data records to the random values through a plurality of update operations at a time of data destruction, wherein the plurality of update operations on one of the one or more subsets of the second set of data records are interlaced with other subsets of the one or more subsets of the second set of data records.

9. The non-transitory computer readable medium of claim 8, wherein the computer-readable instructions, when executed by one or more computing devices, further cause at least one of the one or more computing devices to keep track of data records with the random values and data records with the actual values during the updating.

10. The non-transitory computer readable medium of claim 8, wherein the one or more update operations on one of the one or more subsets of the first set of data records are interlaced with other subsets of the one or more subsets of the first set of data records.

11. The non-transitory computer readable medium of claim 8, wherein the remote data storage platform is a cloud data storage provider.

12. The method of claim 1, wherein the time window is known only to the client of the remote data storage platform.

13. The apparatus of claim 5, wherein the time window is known only to the client of the remote data storage platform.

\* \* \* \* \*